April 12, 1966  F. J. BOLEN  3,245,489
TRACTOR HITCHES OF THE SELF-RESTORING TYPE
Filed Jan. 10, 1962  3 Sheets-Sheet 1
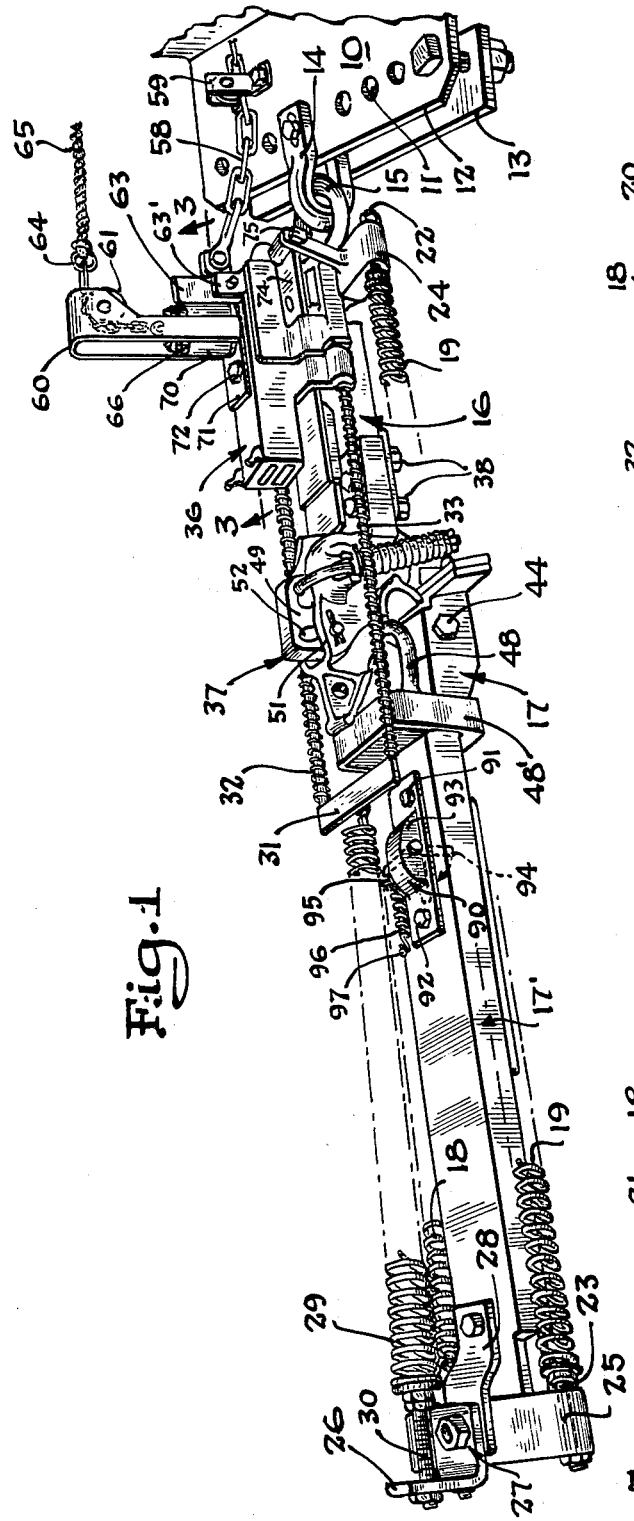
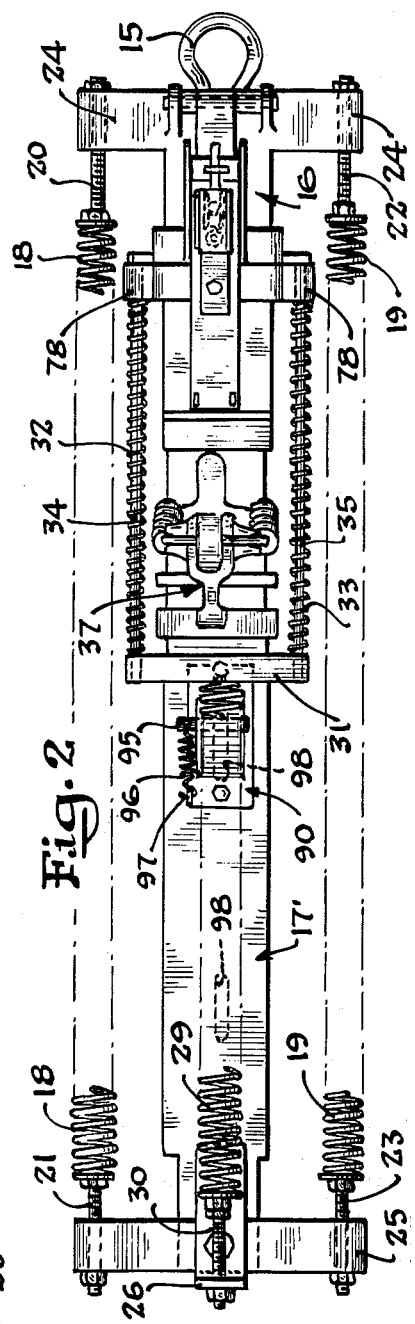
Inventor
Frank J. Bolen
By *Harry C. Alberts*
Attorney

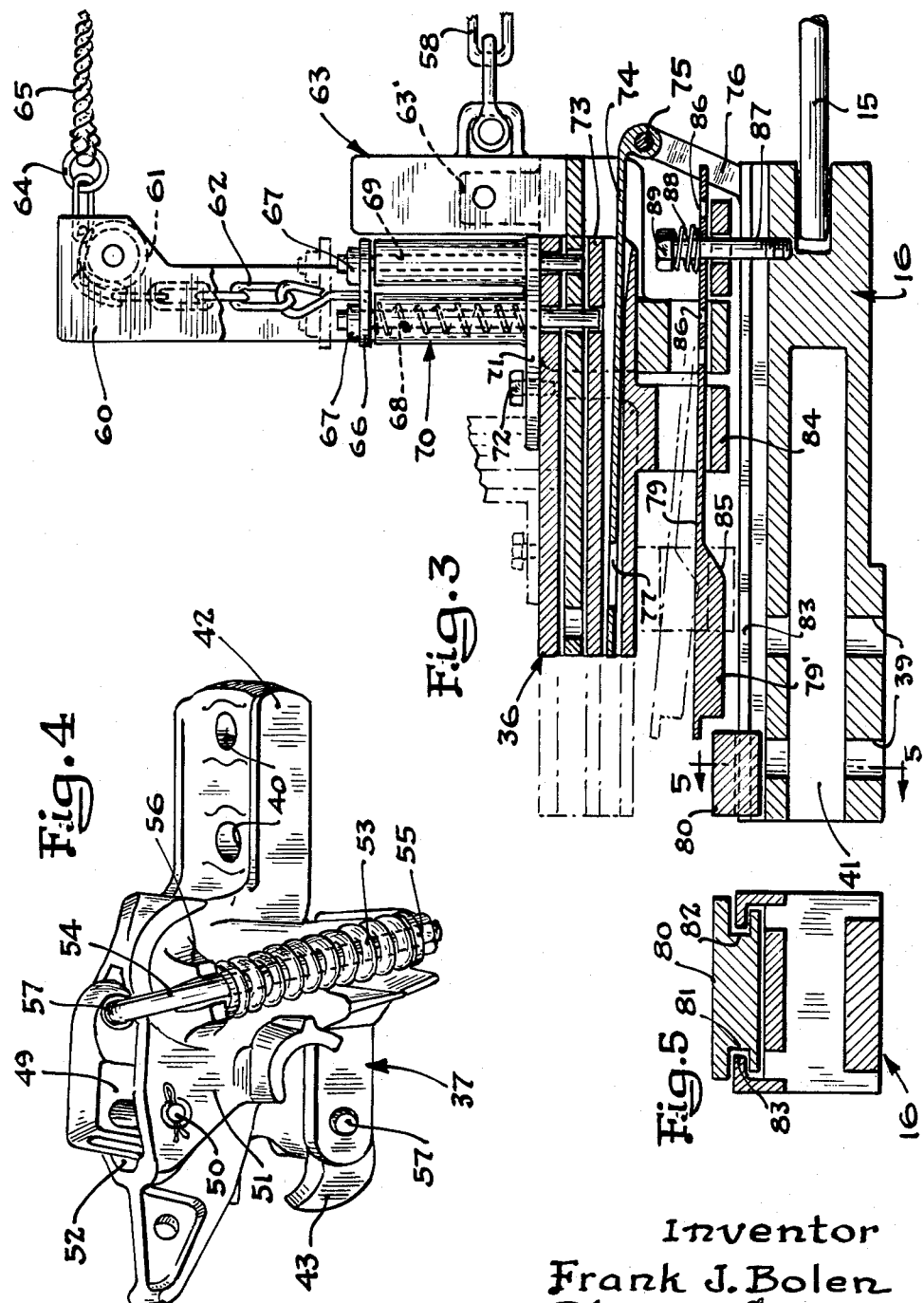

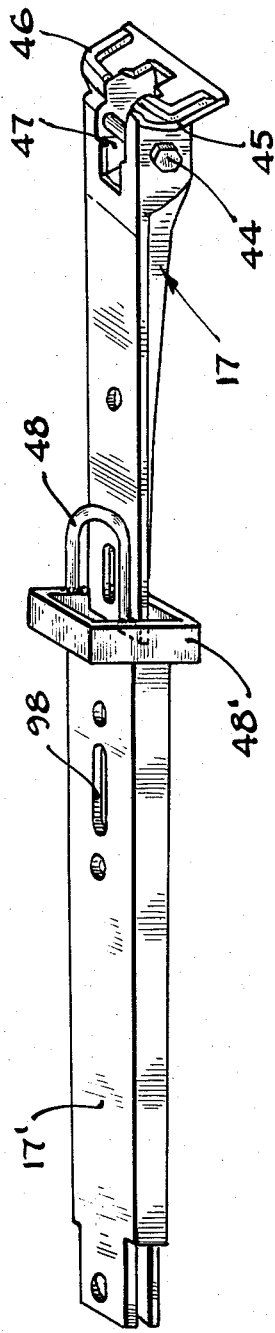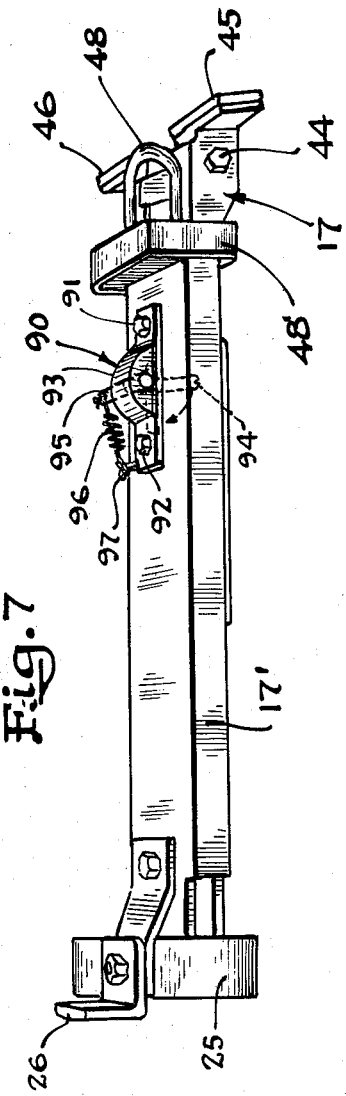

United States Patent Office 3,245,489
Patented Apr. 12, 1966

3,245,489
TRACTOR HITCHES OF THE SELF-RESTORING TYPE
Frank J. Bolen, P.O. Box 55, New Town, N. Dak.
Filed Jan. 10, 1962, Ser. No. 165,438
6 Claims. (Cl. 180—14.5)

This invention relates to tractor hitches and more particularly to automatic overload release tractor hitches of the self-restoring type, although certain features thereof may be employed with equal advantage for other purposes.

It contemplates more especially improvements in the combined automatically releasable tractor couplings having self-restoring instrumentalities which are more effective, dependable, and precise than those heretofore proposed and particularly disclosed in United States letters Patent Numbers 1,872,106 and 2,808,119 wherein the problems are discussed and sought to be overcome without completely accomplishing the desired results with dependability and certainty under adverse conditions which usually prevail when the overload coupling is actuated in meeting unusual obstructions during plowing operations.

One object of the present invention is to simplify the construction and improve the operations of coordinated instrumentalities comprising an effective and dependable tractor hitch for plows and the like.

Another object is to provide improved safety and self-restoring instrumentalities in connection with automatically releasable couplers for connecting drawn plows to tractors and the like.

Still another object is to render automatically releasable couplers more useful and effectively self-restoring without entailing as much time or inconvenience to the tractor operator.

A further object is to provide improved safety and self-restoring instrumentalities in conjunction with overload releasable means so that improved, more dependable, effective and precise tractor hitches for plows are possible therewith.

A still further object is to provide an improved combination of an automatic overload releasable coupler, guide means, and self-restoring elements in a self-contained tractor hitch capable of use with all types of tractors for drawing plows with utmost protection and safety against damage and serious mishaps.

Other objects and advantages will appear from the following description of an illustrated preferred embodiment of the invention which is capable of many variations without departing from the teachings thereof.

In the drawings:

FIGURE 1 is a perspective view of a tractor hitch embodying features of the present invention and illustrated in connection with a standard tractor draw bar of which there are many types.

FIGURE 2 is a plan view of the tractor hitch shown in FIGURE 1 with parts removed to clarify the showing.

FIGURE 3 is a sectional view in elevation of a safety latch used in conjunction with the automatic releasable coupler, and taken substantially along line III—III of FIGURE 1.

FIGURE 4 is a perspective view of a automatic overload releasable coupler advantageously used in combination with a safety latch and self-restoring coupler instrumentalities illustrated as a self-contained assembly in FIGURES 1 and 2.

FIGURE 5 is a sectional fragmentary view in elevation the slide latch stop taken substantially along line V—V of FIGURE 3.

FIGURE 6 is a perspective view of the forward and rearward tow bar plates with the intermediate releasable coupler illustrated in separated relation to clarify the showing.

FIGURE 7 is a perspective view of the rearward tow bar plate and tubular housing therefor showing the cooperative relation therebetween in its connected and separated functions.

The structure selected for illustration is not intended to serve as a limitation upon the scope or teachings of the invention, but is merely illustrative thereof. There may be considerable variations and adaptations of all or part of the teachings depending upon the dictates of commercial practice. The present invention comprises a draw bar 10 in one form or another as a standard part of tractors (not shown). The draw bar 10, in this instance, has a series of vertical holes or apertures 11 in parallel spaced horizontal plates 12–13 to which the usual hook and eye type pivotal connectors 14–15 are applied for drawing the conventional soil preparing instrumentalities which in the present embodiment concerns itself with heavy duty steel plows.

The connectors 14–15 are attached to draw any number of different soil preparing implements, in this instance a safety hitch which is desirable in the drawing of plows that often confront heavy and strongly embedded obstructions such as stones, boulders, tree trunks, roots, and remnants of building structures or the like that are quite capable of inflicting serious damage to the plow and the tractor as well as possible injury to the operator under very adverse terrain and conditions. The safety hitch to which the present invention is directed, involves complementary longitudinal extensible tow bar plates 16–17 and an elongated housing 17' for the latter which are relatively displaceable when the automatic overload coupler disposed therebetween is released in a manner to be hereinafter described, to protect the working parts, the plow, and the tractor as well as insure the safety of the operator.

The eye connector 15 is preferably anchored to the forward extremity of the male tow bar plate 16 (FIGURE 3) which is in end alignment with the rearward tow bar plate 17 and the latter telescopes within the housing 17' which are in yieldingly spring assembled relation by means of heavy duty elongated tension springs 18–19 that are mounted at their ends with screw-type tension adjusting bolt connectors 20–21 and 22–23. These connectors 20–21 and 22–23 are operatively mounted in transverse bracket members 24–25 welded or otherwise anchored to the forward extremity of the tow bar 16 and the rear extremity of the housing 17' which normally confines the tow bar 17 in telescopic relationship therewith. The eye connector 15 is anchored to the center of the front transverse member 24 while the rear transverse member 25 has an upstanding offset bar 26 anchored thereto as at 27 for connection with a bracket 28 fastener attached to the top of the housing 17' (FIGURE 1).

A center heavy elongated tension spring 29 is anchored to the upstanding arm of the offset bar 26 through an adjustable spring bolt connector 30, and this central spring 29 extends to a cross-plate 31 which, in turn, has a pair of comparatively lighter spaced springs 32–33 enveloping guide rods 34–35 extending between the cross-plate 31 and an operator restorable slide latch 36 to be hereinafter described as an operative part of the forward safety-hitch tow bar 16. An automatic overload release coupler 37 (FIGURES 1 and 3) is attached to the forward safety hitch tow bar 16 by means of bolt fasteners 38, in this instance two, that extend through vertical apertures 39–40 after the tow bar chambered end 41 receives the complemental releasable coupler shank 42 (FIGURES 3 and 4). Thus, the releasable coupler or safety hitch overload connector 37 is rigidly connected to the forward tow bar 16 so that its pivotal hook 43 is engageable with a bolt 44 lodged in aligned apertures provided between the furcated ears 45–46 comprising part of the enlarged head end of the tow bar 17. This tow bar head is slotted as at 47 to define the spaced furcated ears 45–46 that receive the releasable coupler hook 43 therein in engagement with the bolt 44 and also an eye connector 48 anchored to the enlarged end 48' formed on and comprising the head of the tubular housing 17' which is drawn in unison with the tow bar 17 when the releasable coupler 37 has its hook 43 in operative engagement with the bolt and eye connectors 44–48, respectively.

The automatic overload releasable coupler 37 is of the spring tension control type, but the specific construction thereof is not per se a part of the present invention. The hook 43 is pivoted about its shank 49 which has a slotted connection with a pin 50 extending through the tubular portion of the coupler housing 51 to permit slidable movement along the coupler shank slot 52, thereby providing a compound pivotal and slidable action of the engaging hook 43 which is controlled by a compression spring 53 that envelops a rod 54 that has a screw threaded nut and plate 55 at its lower end to compress the spring 55 against a furcated abutment 56 formed integrally on the wall of the coupler housing 51. The spring compressing rod 54 has a laterally offset extremity 57 that pivotally engages the hook shank 49 and thus permits the hook 43 to be displaced from engagement with the tow bar bolt 44 and the tow bar housing eye ring 48 to separate them from the forward tow bar 16 when an obstruction to the plow creates a pull in excess of the force of compression required to shorten the spring 53 sufficiently to permit the hook 43 to be displaced from engagement with both the rearward tow bar bolt 44 and tow bar housing eye connector 48.

At this time, the springs 18–19–29–32–33 will be tensioned and the slide latch 36 will follow rearwardly relatively to the forward tow bar 16 (FIGURE 3) at which time a chain 58 attached thereto will be tensioned in relation to a pulley guide 59 fixed to the tractor draw bar 10. This chain extends to the tractor clutch pedal (not shown) in the usual manner to declutch the tractor engine from power connection with the wheels so that the tractor will simultaneously stop as the obstruction against the plow actuates the releasable coupler 37. To this end, the slide latch 36 has an upstanding inverted U-shaped bracket 60 that mounts a rotatable pulley 61 to guide a chain 62 that constitutes part of a trigger remote control as will appear more fully hereinafter. It should be noted that the chain 58 extends to an upstanding lug 63 for connection therewith and the slide latch 36 through any suitable bracket 63'. Now, then, the chain 62 terminates in an eye ring 64 to which a rope 65 is tied for convenient remote access to the tractor operator who may pull same in order to trigger the return of the two tow bars 16–17 and the latter's housing 17' to their initial operative position responsive to the springs 18–19–29–32–33 as will appear more fully hereinafter.

It should be noted that the plow cross bar (not shown) will be connected with the tow bar housing 17' by means of the draft bolt 27 (FIGURES 1 and 6) and indirectly to the springs 18–19–29, the transverse bracket member 25, and the offset bar 26 which is reinforced by the bracket 28 attached to the housing 17' so that all these parts including the adjustably connected heavy spring 29 will operate in unison as the plow comes to a stop against an obstruction in the ground such as a rock tightly imbedded therein. The separating and relatively sliding action of the complemental tow bars 17–17' is initiated at the precise time the plow accidentally is brought to a stop and the coupler 37 responds to a predetermined overload occasioned by the engagement with the obstruction.

This relative movement and separation is safely accomplished with the tow bar housing 17' and eye ring 48 operating in unison with and automatically responsive to the reaction between the obstructed plow and the moving tractor which overloads the hook 43 of the coupler 37 that immediately starts to release. At this point in the operation, the hook 43 will pivot about its shank 49 controlled and resisted by the compression springs 53. This pivoting and sliding procedure of the hook 43 takes place as the tractor gradually pulls the sliding tow bar 17 which has the coupler 37 attached thereto. Thus the springs 18–19–29 are not the source of energy or power that moves the slide latch 36 rearwardly to disengage the tractor clutch as the plow comes to a stop or is abruptly held stationary against an obstruction.

The other end of the chain 62 is anchored to a plate 66 that is disposed below two heads 67 secured thereto and for movement therewith. A suitable set-screw of standard and well known construction (not shown) extends through the collar 67 for the pin 69 to fixedly adjust the vertical position of the latter relative to the plate 66. The parallel spaced vertical pins 68–69 are reciprocally mounted in a plural cylinder block 70 positioned between the arms of the inverted U-shaped bracket 60. The top of the plural cylinder 70 has an inward peripheral flange or stop to retain the spring around the pin 68 and urge the latter downwardly against the plate 74. The pin 69 is fixed relative to the plate 66 and always rides above the slide latch horizontal partition plate 73 while the pin 68 is spring urged downwardly in its collar 67 to serve as a stop after the slide 36 reaches a maximum position of displacement to be presently described; however, the bracket 60 is fixed to the slide 36 by means of its bottom bracket 71 through which a bolt 72 extends for threaded engagement with the top of the slide 36. Oppositely disposed brackets 71 may be used in the event more rigidity is desired in maintaining the trigger return release bracket 60 in assembled relation with the slide 36. The spring urged pin 68 rides above the slide partition 73 and the top surface of the plate 74 that telescopes within the slide 36 for pivotal connection as at 75 to an upwardly inclined bracket 76 formed integral with the forward tow bar 16. The plate 74 which is relatively stationary, has an elongated slot 77 therein near the rearward end thereof to receive the spring urged pin 68 when the latter becomes aligned therewith to preclude any further backward displacement of the slide 36 at which time the desired limit of tension is placed upon the springs 18–19–29–32–33. The latter two springs 32–33 through their elongated bolts 34–35 are connected to depending lugs 78 formed integral with the slide 36 and extending from opposite sides thereof to draw the slide 36 backwardly relatively to the slotted plate 74 until the pin 68 registers with the slot 77 therein. It should be noted that the entire displacement of the tractor clutch during the release thereof is transferred to the pin 69; however, the pin 68 can operate independently, up and down, relative to the pin 69 to enter the slot 77 in the plate 74 (FIGURE 3). The pin 69 and the relatively operable pin 68 are the means of releasing the tractor clutch under the worst conditions should the obstruction to the plow occur, by way of example, while the tractor is travelling upwardly along a steep hill with the plow trailing below. This occurs after the releasable overload hook 43 becomes detached from the tow bar bolt 44 and eye 48 responsive to an obstruction encountered by the plow being drawn and suitably connected to the rear tow bar casing or housing 17' in any number of ways well known in the art.

During the sliding of the latch 36 rearwardly, a tiltably mounted dust plate 79 is elevated so that its comparatively thicker rearward edge 79' is raised above the slide stop 80 which is laterally channelled as at 81–82 to fit into the guide flanges 83 provided on the forward tow bar 16 (FIGURE 3). This tilting movement is accomplished by loop bracket 84 which depends from the slide latch housing 36 to engage the tapered edge 85 of the dust plate lug 79'. It should be noted that the dust plate 79 has a plurality of apertures 86 therein to enable the linear adjustment thereof relative to the dust plate mounting bolt 87 that has a spring 88 in enveloping relation to the upper bolt head 89 to permit the tiltable movement of the dust plate 79 to avoid the tow bar stop 80. This adjustment or resetting of the bolt 89 (FIGURE 3) controls the time of entry of the pin 68 in the plate slot 77 and the timing of the tiltable up and down movement of the dust plate 79 responsive to the release of the tractor clutch with which all moving parts are synchronized. This is desirable so that the clutch on the tractor will disengage or pull out at the precise time the releasable coupler 37 responds to a predetermined overload based upon safe limits to permit the relative sliding movement of the specified parts and still enable the dust plate 79 to be synchronized with the release of the tractor clutch as well as prevent the exposure of the parts to rain, dirt and dust and to avoid damaging the plow or tow bar hitch or the tractor with possible consequent injury to the operator, except for the release of the overload coupler 37 and the separation of the tow bars 16–17–17'.

It will be observed that the springs 18–19 will be tensioned also during the safety operating procedure of the hitch, and the plow has been forced by its pulling tractor to displace the slide latch 36 rearwardly until the sliding latch block 84 abuts against the block 80 and the coupler shank 42 (FIGURES 3 to 5). At this moment, the pin 68 will enter the elongated slot 77 which will allow the blocks 80–84 to abut against each other before the pin 68 reaches the rearward limit of the slot 77. This will take the draft of the pin 69 to its fixed downward position on top of the plate 73 with the blocks 80–84 in engagement with each other. This results in a solid rigid connection with the hitch coupler shank 42 and the sliding latch 36 which operate as a rigid member in conjunction with the coupler 37.

The tractor clutch which has been disengaged will remain inoperative so that the tractor remains stationary until the operator pulls on the rope 65 to elevate latch pin 68 to allow the multiple springs 18–19–29–32–33 to exert their pulling influence on the cross plate 31, tow bar housings 17–17', eye ring 48 and the coupler hook 43 to rehitch in the event the tractor is on grade or in a position above the plow for easy rolling approach thereto. The adjustable heavy spring 29 will assist and react with the sliding latch 36 and clutch of the tractor will reengage to bring the parts to their initial operative positions for re-established connection. As the sliding latch 36 is pushed forward by the plow, the pin 68 engage the forward end of the slot 77. This will keep the tractor clutch from engaging again until the operator pulls the rope 65 which will also allow springs 32–33 to be tensioned further. This allows rods 34–35 to slide forward through their respective lugs serving as guides 78—78 and thus slide past the side walls of the latch 36 so that they may return to their initial position without releasing the pin 68. This action and operation is designed to take effect only when the sliding tow bars 17–17' and the tractor return under the influence of the multiple springs when the tractor is either on level ground or on a hill above the plow. Otherwise this is accomplished by the operator pulling on the rope 65 which will release pin 68 from the slot 77 (FIGURE 3).

It should be noted that the rearward tow bar housing 17' is provided with a bracket 90 fastened thereto by fasteners 91–92 to cover an elongated opening in the surface of the tow bar housing 17'. The bracket 90 has, in this instance, an arcuate upraised body 93 through which a dog 94 is pivotally mounted to present an exteriorly accessible arm 95 that is urged in a counterclockwise direction (viewed from FIGURE 1) by a spring 96 having its other end anchored to a hook 97 formed on the bracket 90. Normally, the depending dog 94 is held in a clockwise displaced horizontal direction by flexing or tensioning the spring 96 to allow the dog 94 to ride over the rearward tow bar 17 until it registers with an elongated slot 98 proximate to the rear end of the draw bar 17 for registry therewith at which time the spring 96 will displace the dog 94 in a counterclockwise direction to enter the slot 98 and thus prevent the tow bar housing to return under the influence of the springs 18–19–29 until the operator pulls the rope 65 and triggers the release of the pin 68 from the slot 77 provided in the plate 74 confined in the slide latch housing 36. It should be noted that the spring controlled and mechanically operating stop dog 94 cooperates with the tractor hitch tow bars 17–17' and specifically the elongated slot 98 (FIGURES 2 and 7) to prevent the tractor from pulling the sliding tow bar housing 17' beyond the end of the tow bar 17, thereby providing a rigid extreme connection to prevent complete separation therebetween irrespective of the tensioning limit of the springs 18–19–29. Thus, the mechanical dog 94 serves as a safety for these springs and precludes them from ever being tensioned beyond their safe limits. At the moment the plow hits a tight obstruction, the springs 18, 19 and 29 are tensioned owing to the relative movement between tow bars 17–17' and the latter with tow bar 16, the dog 94 will enter the elongated slot 98 under the influence of the biasing spring 96 (FIGURE 2) and the sliding bar 17 with its confronting and linearly aligned elongated slot 99 (FIGURE 6) will approach dog 94 riding on the top surface thereof to register therewith and mechanically pull the dog 94 downwardly therein. This establishes a solid connection between the displaced tow bars 17–17' and the connecting springs 18–19–29–31–32. At this time the sliding latch 36 has been pulled rearwardly until the stops 80–84 engage each other. The clutch of the tractor having been released, the tractor and the plow have been stopped, and the latter is held stationary against the tight rock or other obstruction in the ground. Now then, the release of the dead lock between these parts and devices, is through the independent center fixed plate 74 which is capable of being separated from the latch 36 for a limited extent, and slides forward under the influence of the tractor clutch springs to its initial position with the stops 79'–80 in engagement. This procedure will not take place until the operator pulls on the rope 65 which will release the pins 68–69 from engagement with the apertures within the plates 73–74 (FIGURE 3). This transfers the control from the tractor to the operator; however, the operator has two ways of releasing the plow from engagement with the obstruction, namely (1) the tractor hydraulic lifting mechanism control, and (2) the tractor reversing control (both not shown). In any event, the springs 18–19–29–32–33 will be released for spring action, and the parts are in readiness for a repeat cycle of action should another obstruction be engaged, since the dog 94 and the latch 36 and their associated parts assume initial positions as well.

To summarize, when the operator is ready to allow the tow bars 16–17–17' to be self-restored to their initial position of operation after the obstruction has been eliminated or avoided or removed from the path of the plow (not shown), the operator under the circumstance of having the tractor on even grade or above the plow elevation pulls the rope 65 to allow the tensioned springs 18–19–29–32–33 to pull the tractor back a sufficient distance to reunite the parts that have become disengaged and ready the tractor, hitch, and couplers for further pulling of the plow until any further obstruction has been encountered whereupon the same cycle of operations leading to the safe detachment of the tow bars 16–17–17' is repeated as described above.

With the tractor operating down steep hills and the trailing plow should then engage a tightly embedded rock or other obstruction, the tractor would not return under the influence of the springs 18–19–29 on the tow bars 17–17', the sliding tow bar 17 will be pulled ahead until the dog 94 has entered elongated slot 98 to establish a solid connection at the limiting end thereof. At this point the spring 29 has locked the sliding latch 36 against the stop block 84 which is displaced against the coupler shank block 80 (FIGURE 5). Also the tractor clutch has been locked in the throw-out or inoperative position and cannot be released without the contributing function of the independent slide latch 36. It should be observed that the tractor clutch chain 58 is connected to the vertical lug 63 which, in turn, is attached to the sliding plate disposed above the latch housing plate 73, and if the sliding latch 36 is pulled rearwardly against the stop blocks 80–84, the operator should put his right foot on the tractor brake pedal to keep the tractor from rolling down the incline any further.

Now, then, with the operator's left foot on the clutch pedal, he will pull the rope 65 which will release pins 68–69 from the sliding plate having the chain 58 operatively connected therewith and when he gradually releases his foot from the clutch pedal, the springs 32–33 will pull the center slide latch plate forwardly. At this point, both pins 68–69 are riding on top of the fixed plate 73 so that when the operator gradually releases his foot from the clutch pedal, the springs 32–33 pull the slide latch so that stop blocks 80–84 (FIGURE 3) will permit the connection between the hitch tow bars 17–17' and coupler 37 to be re-established. When the plow share point is against a tight obstruction such as a rock, the operator will or can manipulate a hydraulic plow lift lever which is part of the tractor equipment, to elevate the plow over the obstruction and this will allow the plow to be displaced forward under the influence of the springs 18–19–29 so that the hitch tow bars 17–17', the eye ring 48, and the coupler 37 will be restored to their initial operative position (FIGURE 1). Should the operator find it impossible to elevate the plow over the obstruction with the aid of the hydraulic plow lift, the tractor will then have to be reversed while gradually releasing is clutch so that the plow may be slowly moved backwardly away from the obstruction so that the hydraulic plow elevator may again be actuated to avoid the obstruction. It should be understood that suitable complemental dust and dirt shielding covers may be fitted around the exposed parts in order to render such operable with minimum maintenance and adjustment.

It should be noted that in the slide latch 36, the center fixed plate immediately above the partition plate 73, has side brackets that extend upwardly on each side of the vertical lug 63 and is fastened thereto with a pin (FIGURE 3). This mechanism can operate independently of the slide latch 36, but most of the time during normal hitching engagement it functions in unison therewith. The center fixed plate has two vertical holes therein spaced to correspond with the spacing of the pins 68–69 so that the latter can be in registry therewith. As shown, the pin 69 is shown in its downward extreme position (FIGURE 3) in registry with the forward hole in the center fixed plate to enable the pin 69 to ride on the partition plate 73 which is formed integral with the side walls of the slide latch 36. The plate 73 also has a rearward hole to accommodate the spring impelled pin 68 which rides on the top surface of the plate 74 which is always stationary. This takes place when the pin 69 is correctly adjusted relative to its collar 67 which along with the collar for the pin 68, is welded to the cross-plate 66. With the pin 69 held fast in its adjusted position by the set screw fitted into the collar 67 therefor, it is possible and desirable for the pins 68–69 to operate independently of each other.

It should be noted that slide latch plate 74 is stationary relative to the tow bar 16 so that with the pin 68 displaced downwardly in the elongated slot 77 of plate 74, it serves the dual function of preventing the tractor clutch from engaging again while the hitch is disengaged and it also holds the stop 84 of the slide latch 36 against the stop 80 (FIGURE 3). This allows the draft spring bolt 30 to tension the elongated springs 32–33. The spring guide rods 34–35 which are enveloped by the springs 32–33, are free to slide back and forth through their respective lugs 78–78. Thus the rods 34–35 are capable of being displaced independently of the slide latch 36 to permit the disengagement of the spring actuated hitch coupler 37 when the pulling force on the chain 58 exceeds the maximum tension of the hitch spring 53, thereby relying upon the springs 18–19–29–32–33 to retain the complemental elements in aligned relation preparatory to the self-restoring action thereof and coincident with the disengagement of the tractor clutch through the pull on the chain 58 as described above.

With the disengagement of the tractor clutch and the influence of the tensioned springs 18–19–29–32–33, the tractor will creep in reverse until the hitch or coupler 37 attached to the tow bar 17 (FIGURE 6), re-couples through the interaction between the coupler hook 43 (FIGURE 4) and the tow bar housing ring or eye connector 48. The draft spring 29, it should be noted, is anchored to the elongated threaded rod or machine bolt 30 so that the tension of the spring 29 may be varied within in a wide range to afford the best restoring effect under all conditions and circumstances of use. This restoring action is aided by the preloaded springs 32–33 on the elongated rods 34–35 extending therethrough and which exert an urge against the lugs 78. In addition to these springs 18–19–29, the springs 18–19 extend between the cross brackets 24–25 for connection therewith through the threaded turn rods 20–22 and 22–23 which are adjustable as to their exerted tension to draw the tow bars 16–17 together so that the slide 36 may act independently or in unison with the tow bars 16–17 depending upon the particular situation such as terrain, the movability of the obstruction, or the speed of the tractor at the time the obstruction is impacted against by the plow and its yield to the impact.

Upon the return of the sliding tow bar 17' forwardly and the possible approach rearwardly of the tow bar 17 in the event the tractor reverses or rolls toward the hitch owing to the terrain, the coupler 43 will reengage the eye ring 48 in either event and enable the normal progress forward after the plow has been elevated over the obstruction or the latter has moved or the plow has been deflected therefrom. The reengagement will not take place until the tractor operator pulls on the rope 65 which will release pin 68 from the elongated slot 77 in the plate 74. Thereupon the instrumentalities described above will assume their initial operating positions, and the hitch connection is in readiness for separation and self-restoration as previously described. It should be observed that under the most severe circumstances such as involved in operating the tractor in pulling a plow downhill and the latter impacts against a large stone that holds tight in the ground, the coupler hook 43 would be released from the tow bar housing eye ring 48 (FIGURE 1) and the tractor would roll ahead to stretch springs 18, 19, and 29 perhaps to the limit of tow bar separation which shall be construed herein as the desired limit of spring separation or tensioning within the safe limit therefor.

When the foregoing occurs, the dog 94 which has been riding over the rearward tow bar 17' will register with the elongated slot 98 so that the urge of the spring 96 will turn the dog 94 in a clockwise direction (viewed from FIGURE 1) to enter the slot 98 in the sliding tow bar 17. The extreme ends of the slot 98 serve as abutments for engaging the dog 94 in effecting the removal thereof from the slot 98 in one direction of displacement and bring the dog 94 therein in the opposite direction of relative displacement between the tow bars 17–17'. At this latter point in restoring the hitch connection, the forward edge of the slot 98 is solidly against the dog 94 (FIGURE 6) and relieves the springs 18–19–29 from any further tensioning due to the physical connection between the tow bars 17–17' established by the dog 94. Consequently, the position of the dog 94 is controlled by the slot 98 either through the pull of the tractor or the roll of the tractor wheels rearwardly. Obviously in operating down steep hills the tractor would not return under the influence of the springs 18, 19 and 29; however, with the plow impacting against an immovable obstruction, the clutch of the tractor controls the position of the dog 94 and the position of the slide latch 36. Thereupon, the operator pulls the rope 65 which will release the pin 68 from the slot 77 in the plate 74 to allow the slide latch 36 to function while the tractor slowly descends toward the plow under full braking control so that the tow bars 17–17′ can be restored to their initial fully operative position with the plow elevated above the obstruction to clear the progress ahead in the continuance of the plowing. This will permit the tension springs to assist in restoring the coupler connection between the tow bars 16–17–17′. The tractor operator will then pull a hydraulic lever which is part of the tractor (not shown), and lift the plow over the obstruction and proceed normally in the plowing functions with the aid of the pulling tractor.

With the teachings of the invention and the arrangement of parts above described, the separable tow bars 16–17–17′ are always in alignment to insure their return to an initial operable position under the influence of the self-restoring springs 18–19–29–32–33 which are tensioned during the separation of the complemental parts as initiated by the automatic releasable coupler 37 upon impact of the plow with an obstruction that requires a force in excess of the safe limits that could be responsible for damage thereto or to the safety hitch or the tractor itself with consequent injury to the operator. This alignment of the safety hitch elements insure precise operation of the parts to restore them to initial position without the human intervention of the tractor operator, except to trigger the release mechanism to place the self-restoring springs in operable position.

While I have illustrated and described a preferred embodiment of the invention, it must be understood that my invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A tractor hitch comprising aligned tow bars, one of said tow bars comprising an elongated tubular rigid member enclosed on all sides to serve as a tow bar enclosure, the other of said tow bars comprising a rigid elongated member for linear guided telescopic association with said tubular member, an automatically releasable overload coupler interposed between the confronting ends of said tow bars, means on said enclosure for connection with said releasable overload coupler, tension springs connecting said tow bars to normally urge them toward each other, means on said enclosure to prevent the tensioning of said springs beyond a predetermined limit, a slide latch on the other of said tow bars, said slide latch being displaceable longitudinally relative to said tow bar, means attached to said slide latch to displace said slide latch in response to the separation of said tow bars, means on said slide latch to contact said tow bar when said slide latch has moved relative to said tow bar for a predetermined extent and to prevent further movement of said slide latch, and means on said slide latch for connection with the clutch pedal of a tractor to displace said pedal responsive to the displacement of said slide latch.

2. A tractor hitch as defined in claim 1 wherein trigger means are provided on said slide latch to release the mechanical connection with said tow bar, thereby permitting the tensioned springs to restore the connection between said overload coupler and the confronting ends of said tow bars.

3. A tractor hitch as defined in claim 2 wherein remotely operable tension transmitting means operate said trigger means to effect the release of said slide latch.

4. A tractor hitch as defined in claim 2 wherein said tension spring means bridge the ends of said tow bar enclosure and the other aligned tow bar disposed beyond said enclosure.

5. A tractor hitch as defined in claim 3 wherein the overload coupler is rigidly attached to the confronting end of the forward tow bar for releasable connection with the confronting ends of the other tow bar and enclosure therefor.

6. A tractor hitch as defined in claim 4 wherein the release of the overload coupler permits the separation of the aligned tow bars and the telescopic enclosure to tension the springs and load them for self-restoration of the connection between the overload coupler and the confronting ends of the tow bars and enclosure therefor.

References Cited by the Examiner

UNITED STATES PATENTS

| 1,643,653 | 9/1927 | Den Besten | 280—455 |
| 2,381,258 | 8/1945 | Cantral | 280—454 |
| 2,808,119 | 10/1957 | Steinman | 180—14.5 |
| 2,918,310 | 12/1959 | Carson | 280—478 |

FOREIGN PATENTS

| 148,787 | 2/1955 | Sweden. |

LEO FRIAGLIA, *Primary Examiner.*

A. HARRY LEVY, KENNETH H. BETTS, *Examiners.*